(12) United States Patent
Bates et al.

(10) Patent No.: US 7,773,487 B2
(45) Date of Patent: Aug. 10, 2010

(54) APPARATUS AND METHOD TO DETERMINE AN OPTIMAL OPTICAL DETECTOR ORIENTATION TO DECODE HOLOGRAPHICALLY ENCODED INFORMATION

(75) Inventors: Allen Keith Bates, Tucson, AZ (US); Daniel James Winarski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 564 days.

(21) Appl. No.: 11/830,363

(22) Filed: Jul. 30, 2007

(65) Prior Publication Data

US 2009/0034395 A1 Feb. 5, 2009

(51) Int. Cl.
G11B 7/00 (2006.01)
(52) U.S. Cl. .............................. 369/103; 359/32; 359/22
(58) Field of Classification Search ................. 369/103, 369/112.01, 124.12; 359/558, 1, 35, 15, 359/18, 32, 561, 10, 22
See application file for complete search history.

(56) References Cited

U.S. PATENT DOCUMENTS

| | | | |
|---|---|---|---|
| 3,778,128 A * | 12/1973 | Hannan | ........................ 380/54 |
| 5,128,530 A | 7/1992 | Ellerbroek et al. | |
| 5,243,585 A | 9/1993 | Hoshino et al. | |
| 5,483,365 A * | 1/1996 | Pu et al. | ........................ 359/11 |
| 6,185,174 B1 | 2/2001 | Belser | |
| 2004/0179738 A1 | 9/2004 | Dai et al. | |
| 2005/0270954 A1 | 12/2005 | Ain et al. | |
| 2005/0286387 A1 | 12/2005 | Ayres et al. | |
| 2006/0072426 A1 | 4/2006 | Lin et al. | |

OTHER PUBLICATIONS

Honguh et al., "Focusing-error detection using a mixed-aberration-generating holographic optical element", Institution of Electrical Engineers, 2006.

* cited by examiner

Primary Examiner—Thang V Tran
Assistant Examiner—Dionne H Pendleton
(74) Attorney, Agent, or Firm—Dale F. Regelman; Quarles & Brady LLP

(57) ABSTRACT

A method is disclosed to determine an optimal optical detector orientation to decode information encoded holographically. The method supplies a matched filter, an orientation image, a holographic data storage medium encoded with the orientation image, and an optical detector comprising a moveable input screen comprising a plurality of detector elements. The method positions the input screen in a plurality of input screen orientations and calculates a correlation factor for each of the input screen orientations. The method determines an optimal optical detector orientation using the plurality of correlation factors.

20 Claims, 13 Drawing Sheets

FIG. 3C
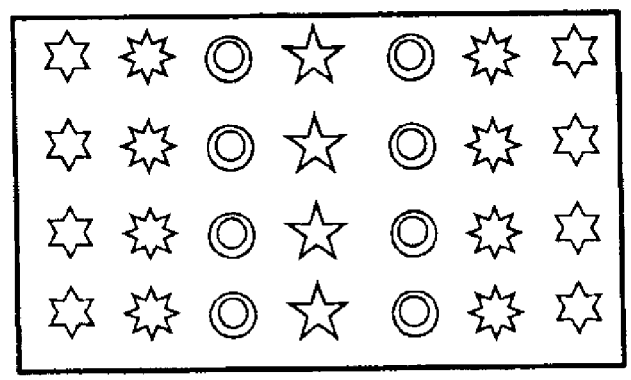
331

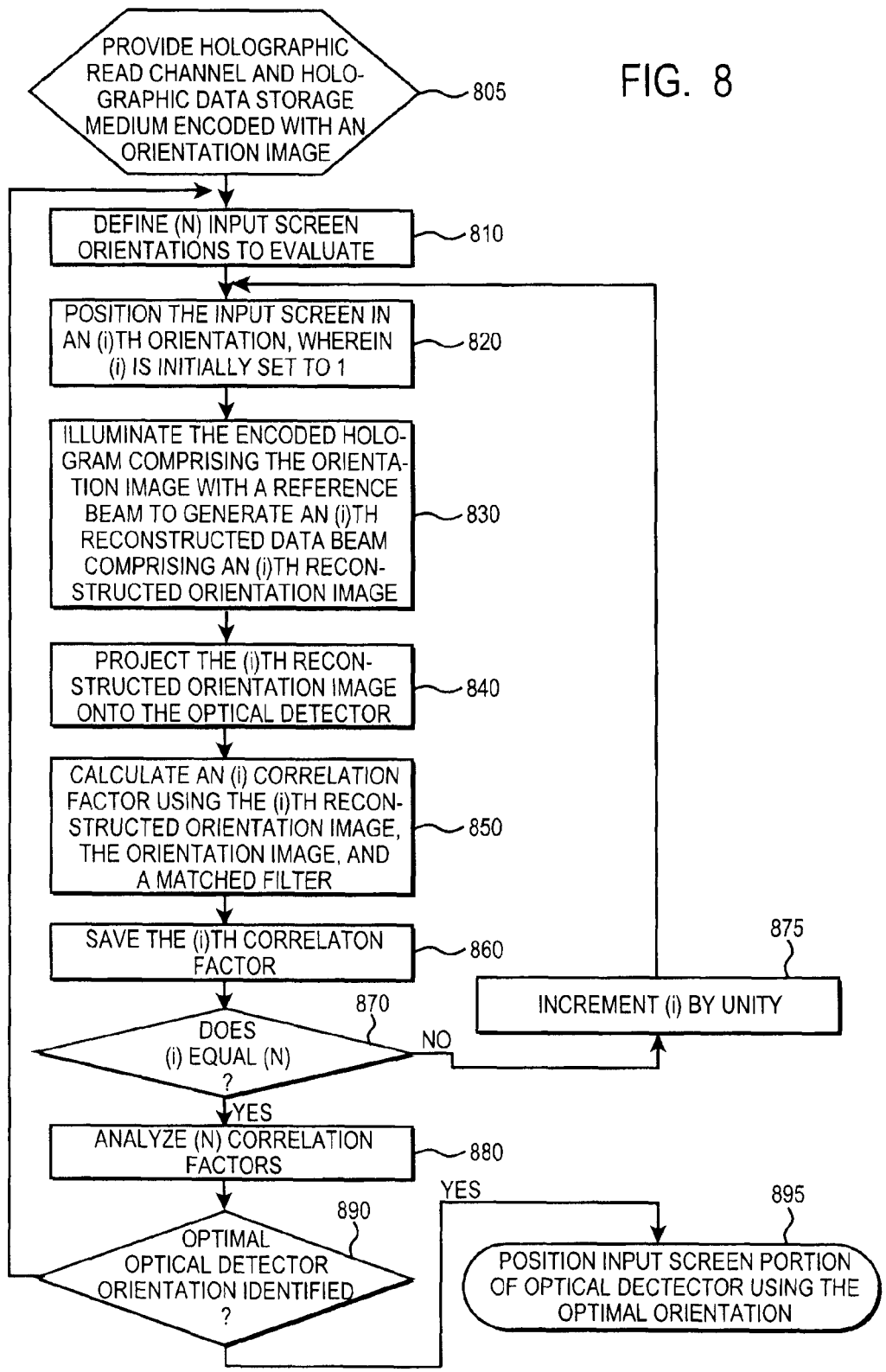

US 7,773,487 B2

APPARATUS AND METHOD TO DETERMINE AN OPTIMAL OPTICAL DETECTOR ORIENTATION TO DECODE HOLOGRAPHICALLY ENCODED INFORMATION

FIELD OF THE INVENTION

This invention relates to an apparatus, and method using that apparatus, determine an optimal optical detector orientation to decode holographically encoded information.

BACKGROUND OF THE INVENTION

In holographic information storage, an entire page of information is stored at once as an optical interference pattern within a thick, photosensitive optical material. This is done by intersecting two coherent laser beams within the storage material. The first, called the data beam, contains the information to be stored; the second, called the reference beam, is designed to be simple to reproduce, for example, a simple collimated beam with a planar wavefront.

The resulting optical interference pattern, of the two coherent laser beams, causes chemical and/or physical changes in the photosensitive medium: a replica of the interference pattern is stored as a change in the absorption, refractive index, or thickness of the photosensitive medium. When the stored interference pattern is illuminated with one of the two waves that was used during recording, some of this incident light is diffracted by the stored interference pattern in such a fashion that the other wave is reconstructed. Illuminating the stored interference pattern with the reference wave reconstructs the data beam, and vice versa.

A large number of these interference patterns can be superimposed in the same thick piece of media and can be accessed independently, as long as they are distinguishable by the direction or the spacing of the patterns. Such separation can be accomplished by changing the angle between the object and reference wave or by changing the laser wavelength. Any particular data page can then be read out independently by illuminating the stored patterns with the reference wave that was used to store that page. Because of the thickness of the hologram, this reference wave is diffracted by the interference patterns in such a fashion that only the desired object beam is significantly reconstructed and imaged on an electronic camera. The theoretical limits for the storage density of this technique are on the order of tens of terabits per cubic centimeter.

SUMMARY OF THE INVENTION

Applicants' invention comprises a method to determine an optimal optical detector orientation to decode information encoded holographically. The method supplies a matched filter, an orientation image, a holographic data storage medium encoded with the orientation image, and an optical detector comprising a rotatable input screen comprising a plurality of detector elements.

The method further establishes (N) input screen orientations, wherein (N) is greater than 1. For each value of (i), wherein (i) is greater than or equal to 1 and less than or equal to (N), the method positions the input screen in an (i)th input screen orientation, illuminates the encoded holographic data storage medium with a reference beam to generate an (i)th reconstructed data beam comprising an (i)th reconstructed orientation image, projects that (i)th reconstructed data beam onto the optical detector, and calculates the (i)th correlation factor using the (i)th reconstructed orientation image, the orientation image, and the matched filter. The method determines an optimal optical detector orientation using the (N) correlation factors.

BRIEF DESCRIPTION OF THE DRAWINGS

The invention will be better understood from a reading of the following detailed description taken in conjunction with the drawings in which like reference designators are used to designate like elements, and in which:

FIG. 3C is a front view of one embodiment of Applicants' orientation image;

FIG. 8 is a flow chart summarizing the steps of Applicants' method;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
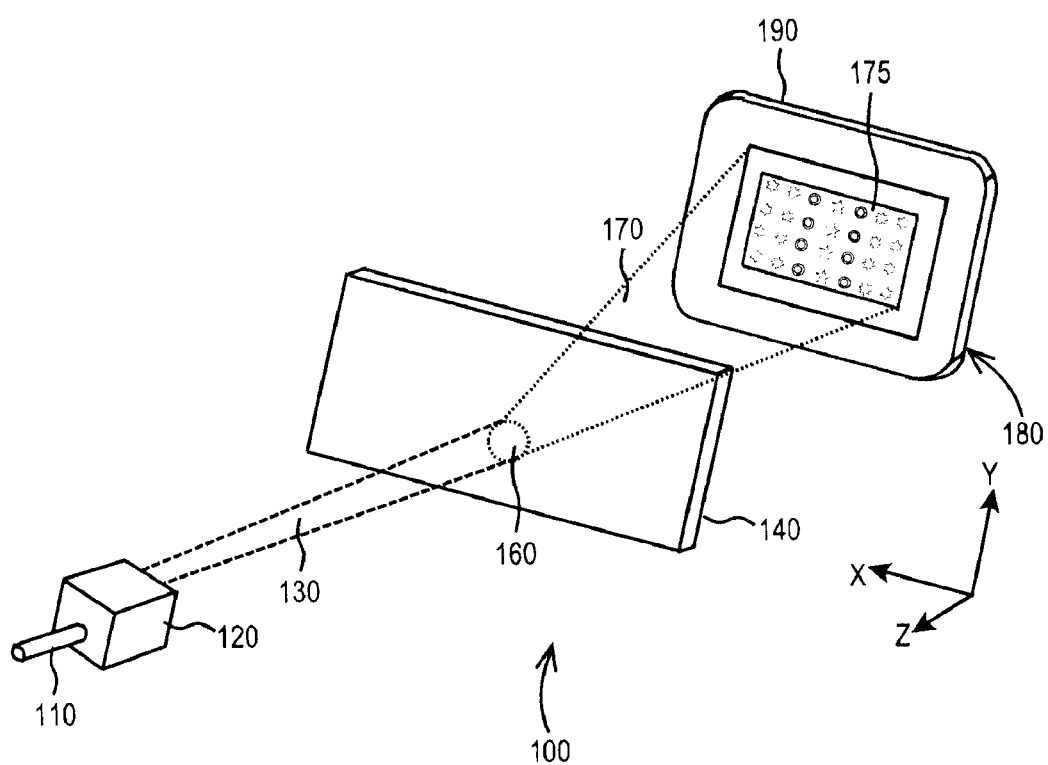
FIG. 1 is a perspective view of one embodiment of Applicants' holographic read channel.

FIG. 1 shows holographic read channel 100. Read channel 100 comprises lasing device 110, beam splitter 120, encoded holographic data storage medium 140, and optical detector 180. In the illustrated embodiment of FIG. 1, reference beam 130 is directed toward encoded holographic storage medium 140 such that reference beam 130 is diffracted by a hologram encoded as interference pattern 160 to form reconstructed data beam 170. Reconstructed data beam 170 is projected onto optical detector 180 such that reconstructed orientation image 175 is displayed input screen 190 which comprises a plurality of optical detector elements. This plurality of detector elements capture the information comprising image 175.

Figure 2:
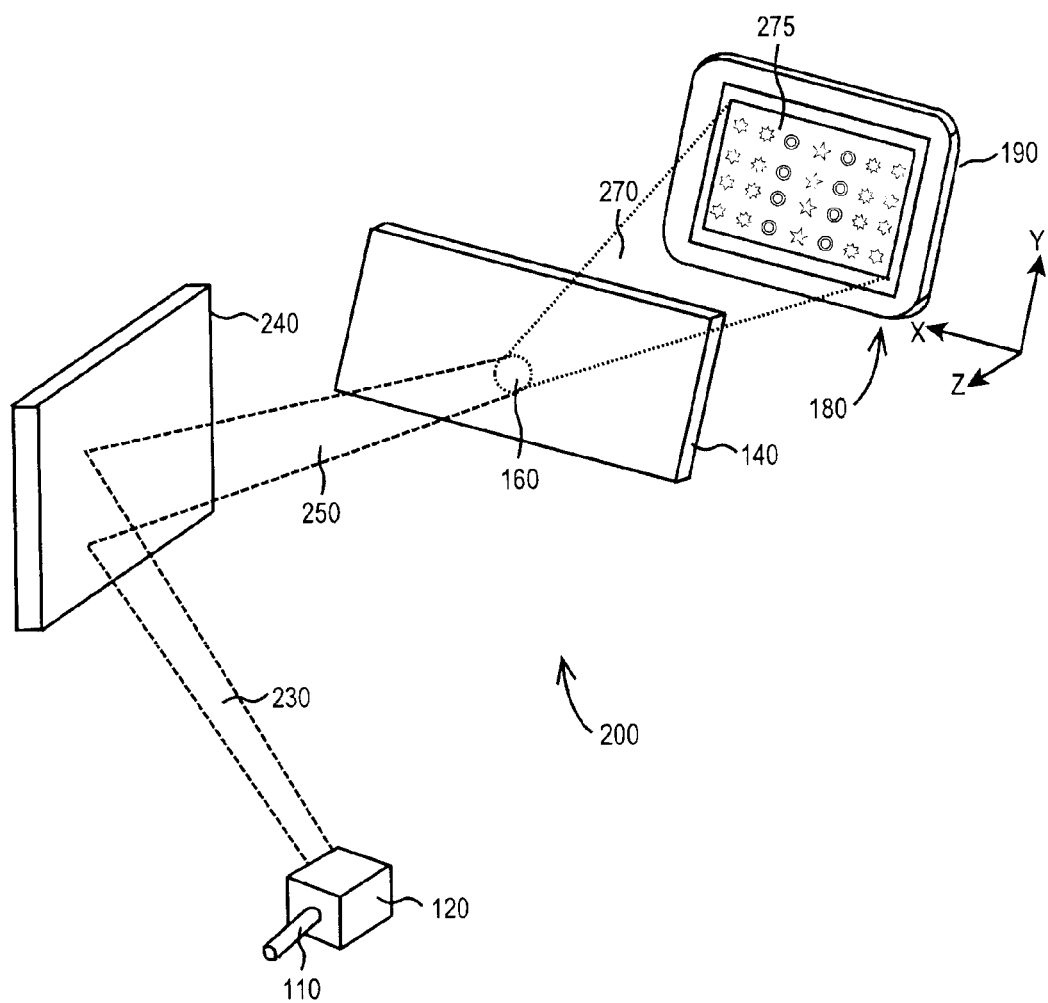
FIG. 2 is a perspective view of a second embodiment of Applicants' holographic read channel.

FIG. 2 shows holographic read channel 200. Read channel 200 comprises lasing device 110, beam splitter 120, mirror 240, encoded holographic data storage medium 140, and optical detector 180. In the illustrated embodiment of FIG. 2, reference beam 230 is reflected off of mirror 240 to become reflected reference beam 250 which is directed toward encoded holographic storage medium 140 such that reflected reference beam 250 is diffracted by the interference pattern 160 to form reconstructed data beam 270 which comprises reconstructed orientation image 275. Image 275 is projected onto the input screen 190. The plurality of detector elements comprising input screen 190 then capture the information comprising image 275.

Figure 3A:
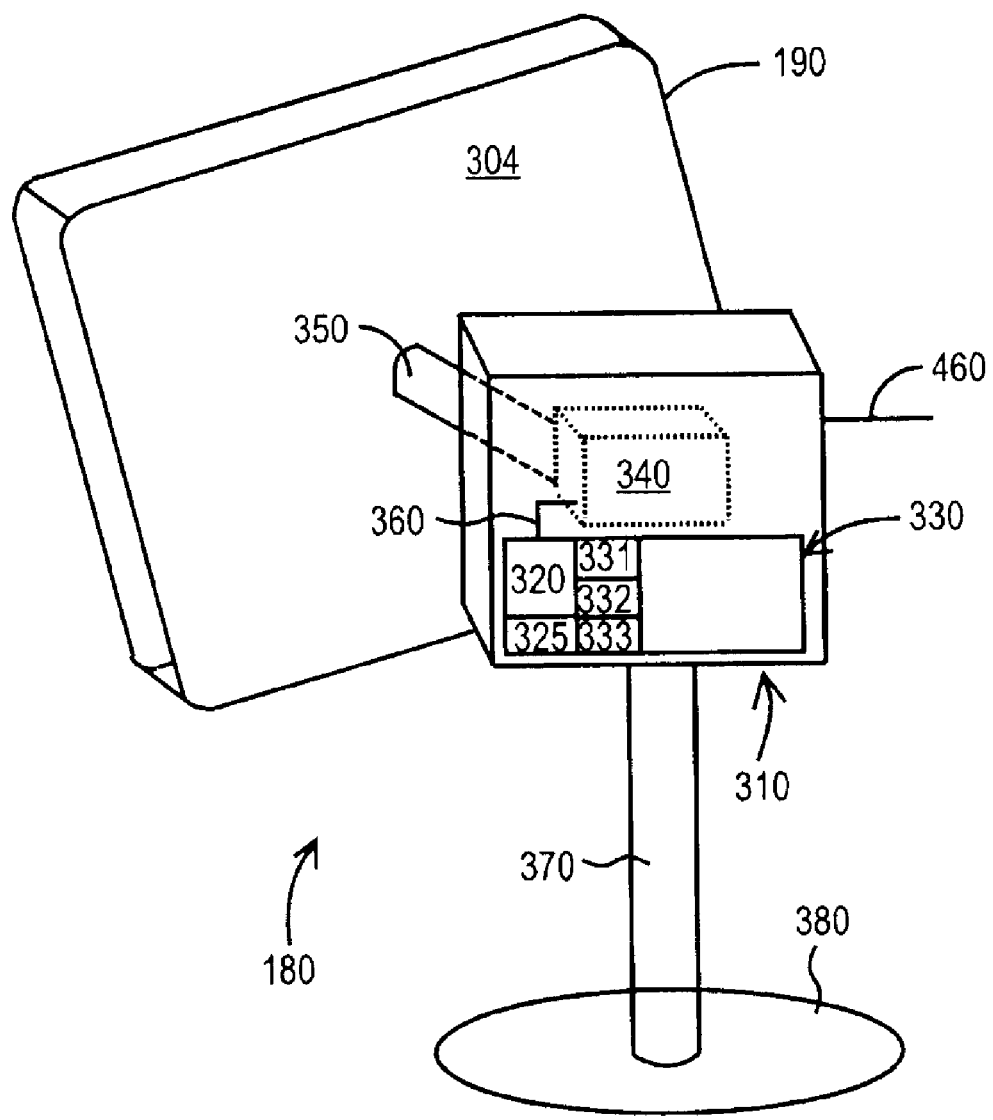
FIG. 3A is a perspective view of a first embodiment of Applicants' optical detector which comprises a rotatable input screen.
Figure 3B:
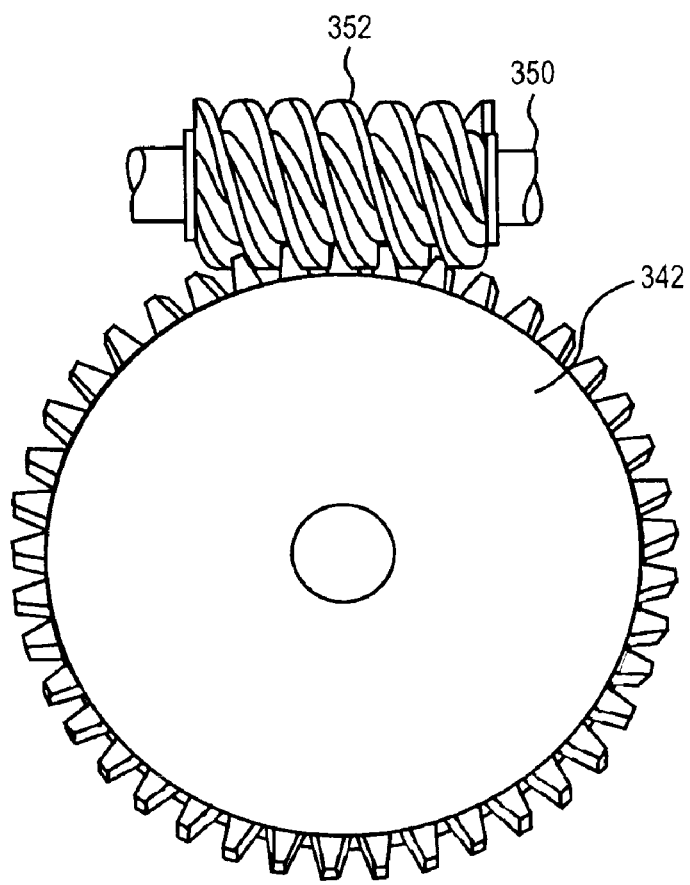
FIG. 3B is a side view of a worm gear assembly disposed in the optical detector of FIG. 3A.

Referring now to FIGS. 3A, 3B, 3C, and 4, optical detector 180 further comprises rotation-error-servo ("RES") 340. As those skilled in the art will appreciate, a servo comprises a device comprising an external shaft, such as rotatable shaft 350. Referring now to FIG. 3B, in certain embodiments RES 340 comprises a rotatable worm wheel 342, and shaft 350 comprises a spirally-threaded portion 352, wherein spiral-threaded portion 352 meshes with worm wheel 342.

Rotatable shaft 350 can be positioned to specific angular positions by sending RES 340 a pre-defined coded signal. As long as that coded signal exists on input line 360, RES 340 will maintain the associated angular position of shaft 350. As the coded signal changes, the angular position of the shaft 350 changes.

RES 340 is interconnected by rotatable shaft 350 to rear portion 304 of input screen 190. RES 340 can cause input screen 190 to rotate in a first direction, i.e. clockwise, or to rotate in a second and opposite direction, i.e. counter-clockwise, by causing rotatable shaft 350 to rotate in the first direction or in the second direction, respectively.

In the illustrated embodiment of FIG. 3A, optical detector 180 further comprises detector controller 310, wherein RES 340 is disposed within detector controller 310. In the illustrated embodiment of FIG. 3A, detector controller 310 further comprises processor 320, instructions 325, and memory 330. In certain embodiments, instructions 325 are integral with processor 320. In other embodiments, instructions 325 are written to memory 330. In certain embodiments, instructions 325 comprise, inter alia, equations 1, 2, 3, 4a, 4b, 4c, 5, 6a, 6b, 7, and 8, described hereinbelow.

In certain embodiments, memory 330 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

In the illustrated embodiment of FIG. 3A, detector controller 310 further comprises orientation image 331, microcode 332, and matched filter 333, written to memory 330. Processor 320 utilizes microcode 332 to operate optical detector 180.

Figure 4:
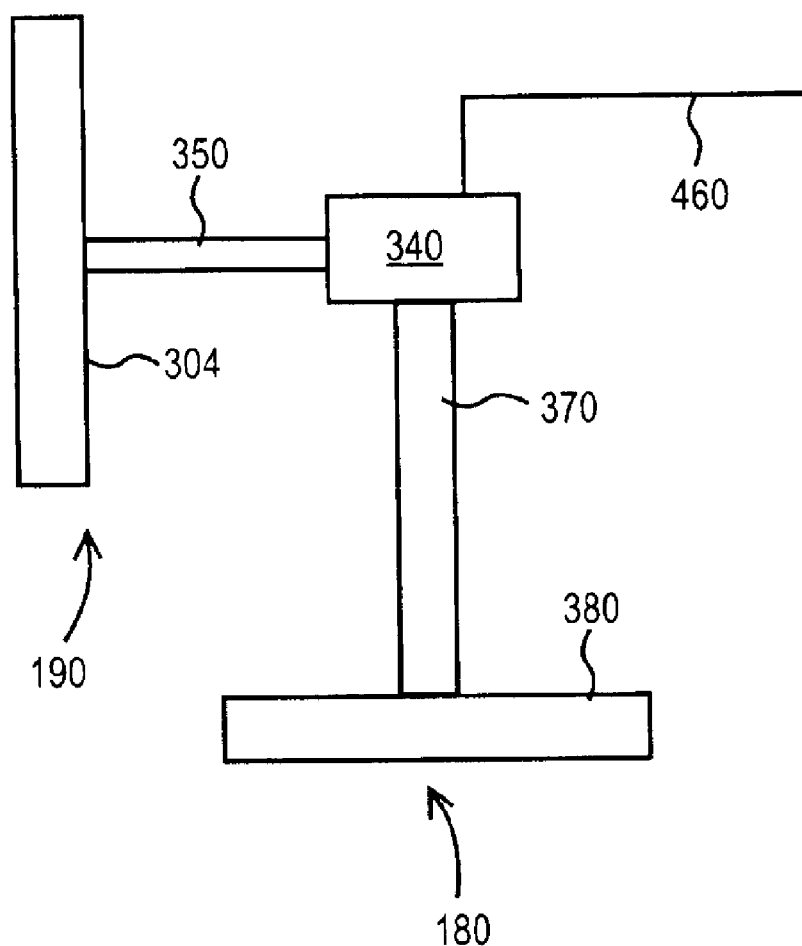
FIG. 4 is a side view of a second embodiment of Applicants' optical detector.
Figure 7:
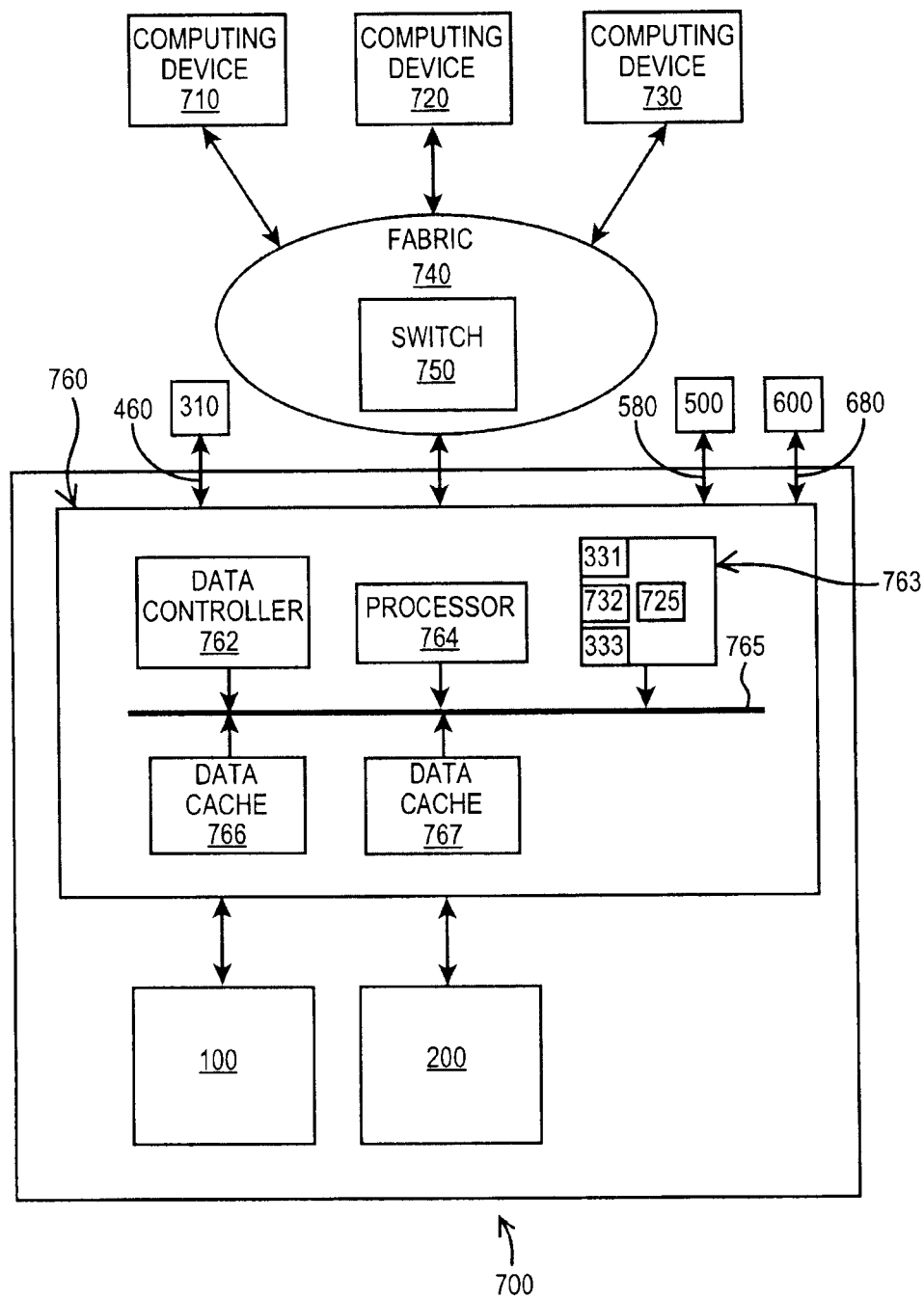
FIG. 7 is a block diagram showing one embodiment of Application's data storage system.

In the illustrated embodiment of FIG. 4, signal input line 460 interconnects RES 340 with an external controller, such as storage controller 760 (FIG. 7). In certain embodiments, optical detector 180 further comprises a floor stand 380 and vertical pillar 370. Pillar 370 may be at any angle other than vertical.

Figure 5:
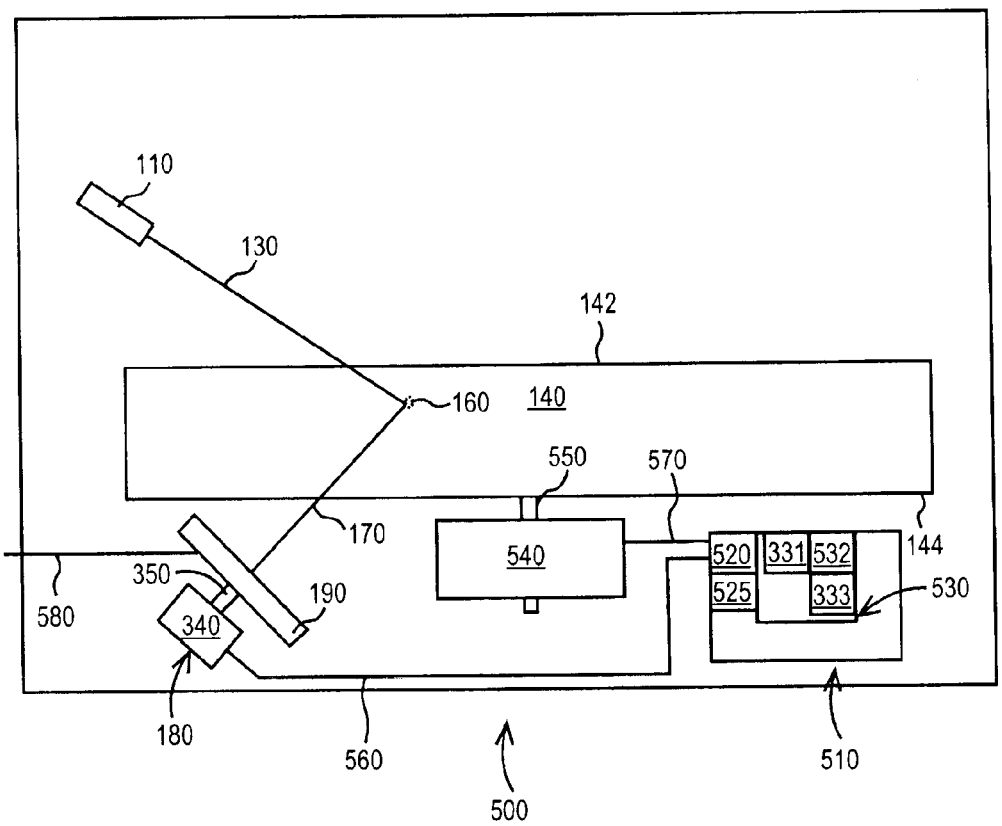
FIG. 5 is a cross-sectional view of one embodiment of Applicants' holographic drive.
Figure 6:
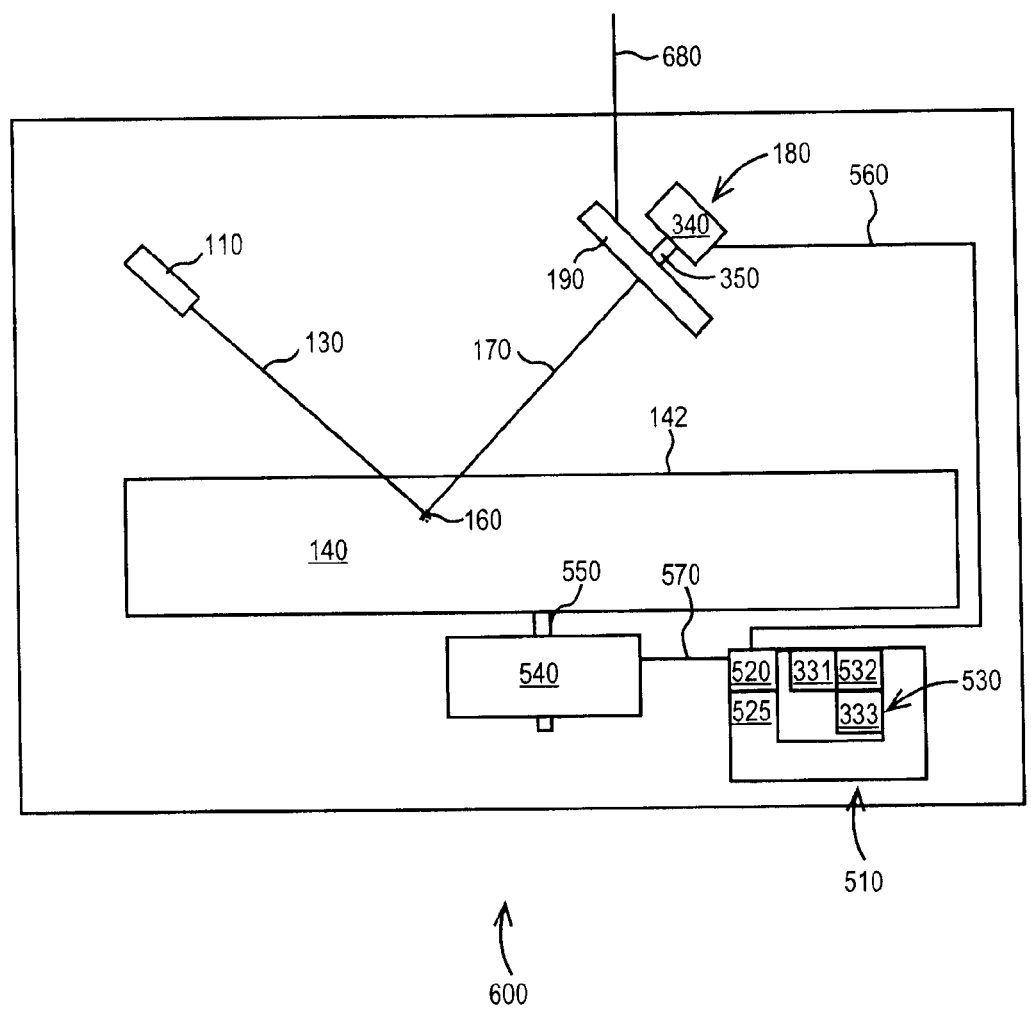
FIG. 6 a cross-sectional view of a second embodiment of Applicants' holographic drive.

Referring now to FIGS. 5 and 6, in certain embodiments lasing device 110 and the rotatable input screen 190 of optical sensor 180, are disposed within holographic drive 500 and 600. In certain embodiments, encoded holographic data storage medium 140 can be removeably disposed within holographic drive apparatus 500 and/or holographic drive apparatus 600.

In the illustrated embodiments of FIGS. 5 and 6, encoded holographic data storage medium 140 is releaseably attached to a drive servo mechanism comprising drive servo 540 and rotatable shaft 550. Drive servo 540 rotates rotatable shaft 550 thereby causing holographic data storage medium 140 to rotate also.

In the illustrated embodiments of FIGS. 5 and 6, holographic drive apparatus 500 and 600 further comprise drive controller 510. Drive controller 510 comprises processor 520, instructions 525, and memory 530. In certain embodiments, instructions 525 are integral with processor 520. In other embodiments, instructions 525 are written to memory 530. In certain embodiments, instructions 525 comprise, inter alia, equations 1, 2, 3, 4a, 4b, 4c, 5, 6a, 6b, 7, and 8, described herein, below.

Orientation image 331, microcode 532, and matched filter 333, are written to memory 530. Drive controller 510 is interconnected with drive servo 540 via communication link 570, and with RES 340 via communication link 560 (FIGS. 5 and 6). Drive controller 510, using processor 520 and microcode 532, can cause holographic data storage medium 140 to rotate at a first rotation rate, and can simultaneously cause input screen 190 to rotate at a second rotation rate, wherein the first rotation rate may equal the second rotation rate, and wherein the first rotation rate may differ from the second rotation rate.

In certain embodiments, memory 530 comprises non-volatile memory, such as and without limitation, battery backed-up RAM; a magnetic disk in combination with the associated software, firmware, and hardware, to read information from, and write information to, that magnetic disk; an optical disk in combination with the associated software, firmware, and hardware, to read information from, and write information to, that optical disk; an electronic storage medium; and the like. By "electronic storage medium," Applicants mean, for example, a device such as a PROM, EPROM, EEPROM, Flash PROM, compactflash, smartmedia, and the like.

FIG. 5 shows holographic drive apparatus 500 being used to decode hologram 160. Lasing device 110 directs reference beam 130 through a first side 142 of holographic data storage medium 140 and onto the hologram encoded in holographic data storage medium 140 as interference pattern 160 thereby generating reconstructed data beam 170. Reconstructed data beam 170 is projected outwardly through second side 144 of holographic data storage medium and onto input screen 190. In the illustrated embodiment of FIG. 5, lasing device 110 is disposed adjacent first side 142 of holographic data storage medium 140 and input screen 190 is disposed adjacent second side 144 of holographic data storage medium 140.

In the illustrated embodiment of FIG. 5, input screen 190 outputs information using communication link 580. In certain embodiments, communication link 580 is interconnected with one or more host computers. In certain embodiments, communication link 580 is interconnected with a storage controller, such as for example storage controller 760 (FIG. 7).

FIG. 6 shows holographic drive apparatus 600 being used to decode hologram 160. Lasing device 110 directs reference beam 130 through a first side 142 of holographic data storage medium 140 and onto the hologram encoded in holographic data storage medium 140 as interference pattern 160 thereby generating reconstructed data beam 170. Reconstructed data beam 170 is projected outwardly through first side 142 of holographic data storage medium and onto input screen 190. In the illustrated embodiment of FIG. 6, lasing device 110 is disposed adjacent first side 142 of holographic data storage medium 140 and input screen 190 is disposed adjacent first side 142 of holographic data storage medium 140.

In the illustrated embodiment of FIG. 6, input screen 190 outputs information using communication link 680. In certain embodiments, communication link 680 is interconnected with one or more host computers. In certain embodiments, communication link 680 is interconnected with a storage controller, such as for example storage controller 760 (FIG. 7).

FIG. 7 illustrates one embodiment of Applicants' data storage system 700. In the illustrated embodiment of FIG. 7, data storage system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage system 700 comprises holographic data storage system 100 (FIGS. 1, 2), and/or holographic data storage system 200 (FIGS. 3, 4), and/or holographic drive 500 (FIG. 5) and/or holographic drive 600 (FIG. 6).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, processor 764, and data caches 766 and 767, wherein these components communicate through a data bus 765. In the illustrated embodiment of FIG. 7, orientation image 331, microcode 732, instructions 725, and matched filter 333 are written to memory 763. In certain embodiments, instructions 725 comprise, inter alia, equations 1, 2, 3, 4a, 4b, 4c, 5, 6a, 6b, 7, and 8, described hereinbelow.

In certain embodiments, memory 763 comprises a magnetic information storage medium, an optical information storage medium, an electronic information storage medium, and the like. By "magnetic storage medium," Applicants mean, for example, a device such as a hard disk drive, floppy disk drive, or magnetic tape. By "optical information storage medium," Applicants mean, for example, a Digital Versatile Disk ("DVD"), High-Definition DVD ("HD-DVD"), Blu-Ray Disk ("BD"), Magneto-Optical ("MO") disk, Phase-Change ("PC") disk, etc. By "electronic storage media," Applicants mean, for example, a device such as a PROM, EPROM, EEPROM, Flash PROM, compactflash, smartmedia, and the like. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

Applicants' invention comprises a method using Applicants' apparatus described hereinabove to determine an optimal input screen orientation, i.e. the optimal input screen rotation. FIG. 8 summarizes Applicants' method.

Referring now to FIG. 8, in step 805 Applicants' method provides a holographic data storage medium encoded with an orientation image, such as for example orientation image 331 (FIG. 3C), and a holographic read channel, such as for example holographic read channel 100 (FIG. 1), or holographic read channel 200 (FIG. 2), or holographic drive 500 (FIG. 5), or holographic drive 600 (FIG. 6). In certain embodiments, holographic read channel 100 and/or 200, and/or holographic drive 500 and/or 600, is interconnected with a storage controller, such as for example and without limitation storage controller 760 (FIG. 7).

In certain embodiments, the orientation image is stored on an optically transparent, read-only data storage medium which is then physically implanted in the holographic data storage medium at the time of manufacture. In other embodiments, the orientation image is stamped or lithographed onto the holographic data storage medium at the time of manufacture.

In step 810, Applicants' method defines (N) input screen orientations for evaluation. In certain embodiments, step 810 is performed by drive controller 510 (FIGS. 5, 6). In certain embodiments, step 810 is performed by storage controller 760 (FIG. 7). In certain embodiments, step 810 is performed by the operator of the holographic read channel/holographic drive of step 805. In certain embodiments, step 820 is performed by the owner and/or operator of a host computer interconnected with the holographic read channel and/or holographic drive of step 805.

In certain embodiments, (N) is 3. In other embodiments, (N) is greater than 3. In certain of the (N)=3 embodiments, the first input screen orientation $R_1$ is defined as the second input screen orientation $R_2$ minus an incremental rotation r:

$$R_1 = R_2 - r$$

In certain of these (N)=3 embodiments, the third input screen orientation $R_3$ equals the second input screen orientation $R_2$ plus the same increment rotation r:

$$R_3 = R_2 + r$$

In step 820, the method positions the input screen, such as input screen 190, in the (i)th orientation, wherein (i) is initially set to 1. In certain embodiments, step 820 is performed by drive controller 510 (FIGS. 5, 6). In certain embodiments, step 820 is performed by storage controller 760 (FIG. 7). In certain embodiments, step 820 is performed by the operator of the holographic read channel/holographic drive of step 805. In certain embodiments, step 820 is performed by the owner and/or operator of a host computer interconnected with the holographic read channel and/or holographic drive of step 805.

In step 830, Applicants' method illuminates an orientation image hologram encoded in the holographic data storage medium with a reference beam, such as reference beam 130 (FIGS. 1, 5, 6) or reflected reference beam 250 (FIG. 2), to generate the (i)th reconstructed data beam, such as reconstructed data beam 170 (FIG. 1) or reconstructed data beam 275 (FIG. 2), wherein that (i)th reconstructed data beam comprises a reconstructed orientation image, such as reconstructed orientation image 175 (FIG. 1) or reconstructed orientation image 275 (FIG. 2). In certain embodiments, step 830 is performed by drive controller 510 (FIGS. 5, 6). In certain embodiments, step 830 is performed by storage controller 760 (FIG. 7).

In step 840, Applicants' method projects the (i)th reconstructed data beam of step 830 onto a rotatable input screen, such as input screen 190 (FIGS. 1, 2, 3A, 4, 5, 6). In step 850, Applicants' method calculates an (i)th correlation factor using the (i)th reconstructed orientation image, the stored orientation image 331 (FIGS. 3A, 3C, 5, 6, 7), and Applicants' matched filter 333 (FIGS. 3A, 5, 6, 7). In certain embodiments, step 850 is performed by drive controller 510 (FIGS. 5, 6). In certain embodiments, step 850 is performed by storage controller 760 (FIG. 7).

Figure 9A:
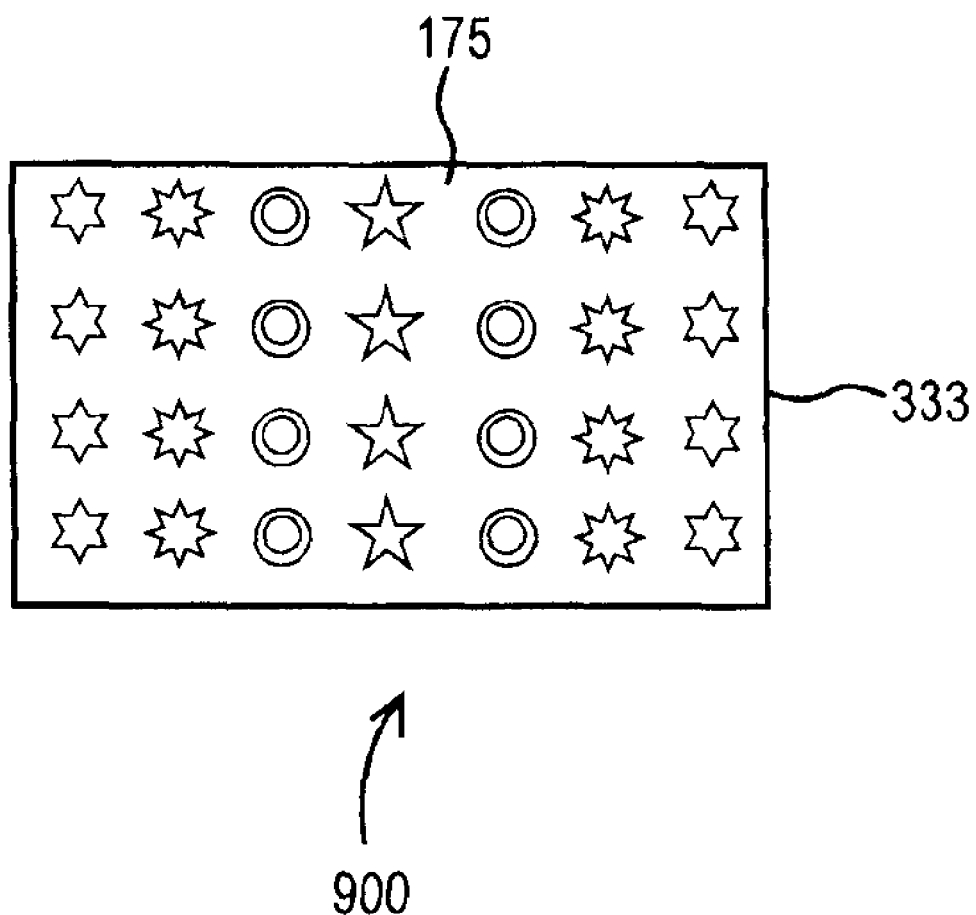
FIG. 9A illustrates a first reconstructed orientation image seen using Applicants' matched filter.

Referring now to FIG. 9A, image 900 illustrates a reconstructed orientation image, such as for example reconstructed orientation image 175, as seen through Applicants' matched filter 333, wherein the Y axis of matched filter 333 comprises a vertical orientation. By "vertical orientation," Applicants mean that the Y axis of matched filter 333 is aligned with the direction of the force of gravity, as materialized, for example, with a plumb line. As those skilled in the art will appreciate, the X axis of Applicants' matched filter 333 comprises a horizontal orientation. By "horizontal orientation," Applicants mean that all points comprising the X axis of matched filter 333 are perpendicular to the direction of the gravitational force.

In certain embodiments, in step 850 Applicants' method calculates as the (i)th correlation factor the difference between g(x,y) of the (i)th reconstructed orientation image as seen through Applicants' matched filter 333 and impulse response h(x,y)=s*(−x,−y) of the orientation image 331 (FIG. 3C). Referring now to Equation (1), V(x,y) comprises the cross-correlation between the reconstructed orientation pattern as seen through Applicants' matched filter 331 and s(x,y) for orientation image 331. As those skilled in the art will appreciate, Equation (1) comprises a double integral, meaning that the integration is over the X axis and Y axis directions of the detector elements of input screen 190. Additionally, ξ is the integration variable along that X axis, η is the integration variable along that Y axis, and * denotes a complex conjugate.

$$V(x,y) = \iint g(\xi,\eta)s^*(\xi-x,\eta-y)d\xi d\eta \qquad (1)$$

Mathematically, V(x,y) comprises a surface varying along the X axis and the Y axis, for each (x,y). There is one value of V(x,y) for each detector element in input screen 190. In certain embodiments, the range V(x,y) for each (x,y) is between −1 and +1, wherein +1 represents the ideal correlation of one hundred (100%). In certain embodiments, in step 880 the (i)th correlation value comprises the average Y(i) over the plurality of V(x,y) values determined for the (i)th reconstructed data beam using Equation (1).

In step 860, Applicants' method saves the (i)th correlation factor of step 850. In certain embodiments, the (i)th correlation factor is saved in memory disposed in a controller, such as memory 530 (FIGS. 5, 6) disposed in drive controller 510 (FIGS. 5, 6), or memory 763 (FIG. 7) disposed in storage controller 760 (FIG. 7). In certain embodiments, step 860 is performed by drive controller 510 (FIGS. 5, 6). In certain embodiments, step 860 is performed by storage controller 760 (FIG. 7).

In step 870, Applicants' method determines if (i) equals (N). In certain embodiments, step 870 is performed by drive controller 510 (FIGS. 5, 6). In certain embodiments, step 870 is performed by storage controller 760 (FIG. 7).

If Applicants' method determines in step 870 that (i) does not equal (N), then the method transitions from step 870 to step 875 wherein the method increments (i) by unity. In certain embodiments, step 875 is performed by drive controller 510 (FIGS. 5, 6). In certain embodiments, step 875 is performed by storage controller 760 (FIG. 7). Applicants' method transitions from step 875 to step 820 and continues as described herein.

If Applicants' method determines in step 870 that (i) does equal (N), then the method transitions from step 870 to step 880 wherein the method analyzes the (N) correlation factors determined using the (N) input screen orientations of step 810.

In certain embodiments, in step 880 Applicants' method subtracts rotation $R_2$ from the three input screen rotations as described hereinabove to give three data points, namely [−r, Y(1)], [0, Y(2)], and [r,Y(3)]. As those skilled in the art will appreciate, the equation for a parabola is given in Equation 3, wherein r denotes the incremental rotation, and wherein B0, B1, and B2 comprise unknowns to solve for, to identify the optimal incremental rotation:

$$Y = (B2)(r^2) + (B1)(r) + B0 \qquad (3)$$

The least-squares equations wherein (N) is 3 are given in Equations 4a, 4b, and 4c:

$$(N)(B0) + (B1)(\Sigma r) + (B2)(\Sigma r^2) = \Sigma Y \qquad (4a)$$

$$(B0)(\Sigma r) + (B1)(\Sigma r^2) + (B2)(\Sigma r^3) = \Sigma(Yr) \qquad (4b)$$

$$(B0)(\Sigma r^2) + (B1)(\Sigma r^3) + (B2)(\Sigma r^4) = \Sigma(Yr^2) \qquad (4c)$$

Equations 4a, 4b, and 4c, give matrix equation 5 with unknowns B0, B1, and B2:

$$|3 \; 0 \; 2r^2| |B0| |Y(1)+Y(2)+Y(3)|$$

$$|0 \; 2r^2 \; 0| |B1| = |r[Y(3)-Y(1)]|$$

$$|2r^2 \; 0 \; 2r^4| |B2| |r^2[Y(3)+Y(1)]| \qquad (5)$$

Solving Equation 5 for B1 and B2 gives Equations 6a and 6b:

$$B1 = [Y(3)-Y(1)]/2r \qquad (6a)$$

$$B2 = [Y(3)-2Y(2)+Y(1)]/2r^2 \qquad (6b)$$

Solving for dY/dr in Equation 3 and setting that to zero gives the value of the optimal incremental rotation, provided that B2<0. If Y(2) is greater than both Y(1) and Y(3), then B2<0. The following example is presented to further illustrate to persons skilled in the art how to make and use the invention. This example is not intended as a limitation, however, upon the scope of the invention.

EXAMPLE

Figure 9B:
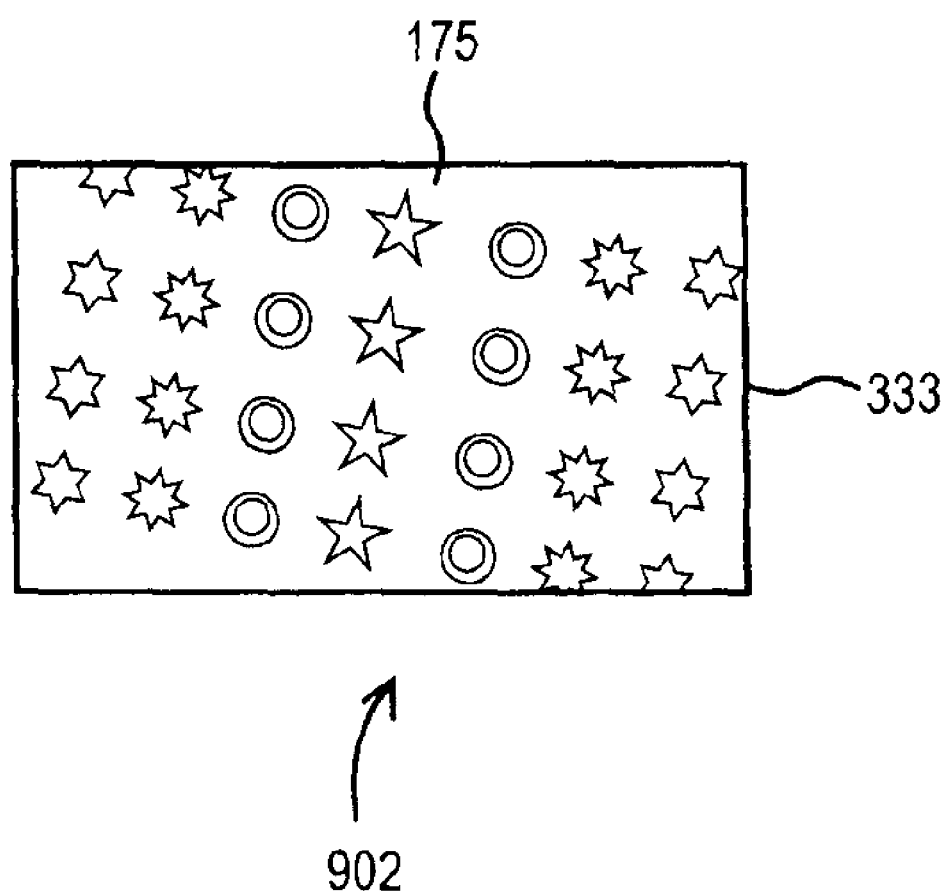
FIG. 9B illustrates a second reconstructed orientation image seen using Applicants' matched filter.
Figure 9C:
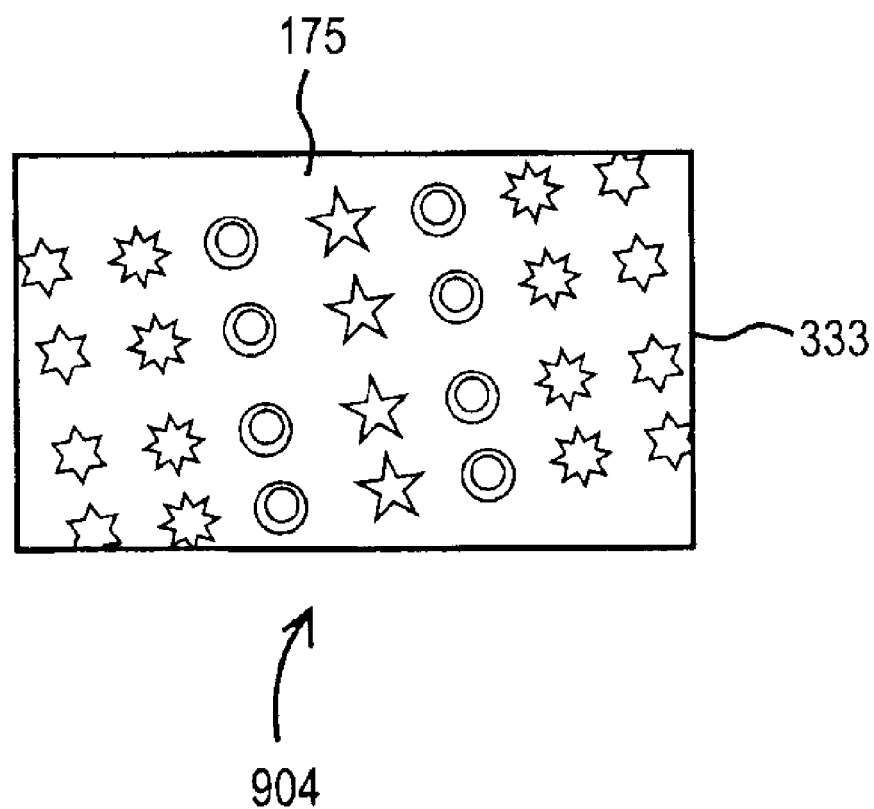
FIG. 9C illustrates a third reconstructed orientation image seen using Applicants' matched filter.

Referring now to FIGS. 9A, 9B, and 9C, if image 900 comprises reconstructed orientation image 175 as seen through Applicants' matched filter 333 for input screen orientation $R_2$, and if image 902 comprises reconstructed orientation image 175 as seen through Applicants' matched filter 333 for input screen orientation $R_1$, and if image 904 comprises reconstructed orientation image 175 as seen through Applicants' matched filter 333 for input screen orientation $R_3$. Comparing images 900, 902, and 904, with orientation image 331 (FIG. 3C), the correlation between image 900 and orientation image 331 is greater than the correlation between image 902 and orientation image 331, and is also greater than the correlation between image 904 and orientation image 213. Therefore in this Example, Y(2) would be greater than both Y(1) and Y(2).

As those skilled in the art will appreciate, the condition that B2<0 results from the second derivative of a parabola being negative when a condition of optimal incremental rotation exists.

$$\text{Optimal incremental rotation} = -B1/2B2 \quad (2)$$
$$= (r)[Y(1) - Y(3)]/$$
$$\{2[Y(3) - 2Y(2) + Y(1)]\}$$

Adding rotation $R_2$ to both sides of Equation 7 gives Equation 8, wherein Ropt equals $R_2$+optimal incremental rotation:

$$Ropt = R_2 - B1/2(B2) \quad (8)$$

Applicants' method transitions from step 880 to step 890 wherein the method determines if the optimal rotation has been identified. If B2<0, then Applicants' method determines in step 890 that the optimal rotation has been identified, and is given in Equation 8, and the method transitions from step 890 to step 895 wherein the method orients the input screen portion 190 of optical detector 180 using that optimal rotation.

Alternatively, if B2≧0, then Applicants' method determines in step 890 that the optimal rotation has not been identified, and the method transitions from step 890 to step 810 wherein the method sets new input screen orientations for evaluation. In certain embodiments, if B2≧0 and Y(3)>Y(1), then in step 810 Applicants' method selects new input screen orientations $R_4 = R_3 + r$, sets $R_2 = R_3 - r$, and repeats the method of FIG. 8 using input screen rotations $R_2$, $R_3$, and $R_4$. In certain embodiments, if B2≧0 and Y(3)≦Y(1), then in step 810 Applicants' method sets a new input screen orientations $R_0 = R_1 - r$, $R_2 = R1 + r$, and repeats the method of FIG. 8 using input screen rotations $R_0$, $R_1$, and $R_2$.

In certain embodiments, individual steps recited in FIG. 8 may be combined, eliminated, or reordered.

In certain embodiments, Applicants' invention includes instructions, such as instructions 525 (FIGS. 5, 6) written to memory 530 (FIGS. 5, 6) and/or instructions 725 (FIG. 7) written memory to 763 (FIG. 7), where those instructions are executed by a processor, such as processor 520 (FIGS. 5, 6) or processor 764 (FIG. 7), respectively, to perform one or more of steps 810, 820, 830, 850, 860, 870, 875, 880, 890, and/or 895, recited in FIG. 8.

In other embodiments, Applicants' invention includes instructions residing in any other computer program product, where those instructions are executed by a computer external to, or internal to, read channel 100, or read channel 200, or holographic drive 500, or holographic drive 600, to perform one or more of steps 330, 340, 350, and/or 360 recited in FIG. 3, and/or one or more of steps 810, 820, 830, 850, 860, 870, 875, 880, 890, and/or 895, recited in FIG. 8. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to determine an optimal optical detector orientation to decode holographically encoded information, comprising the steps of:
    supplying a matched filter;
    supplying an orientation image;
    supplying a holographic data storage medium encoded with said orientation image;
    supplying an optical detector comprising a rotatable input screen comprising a plurality of detector elements;
    establishing (N) input screen orientations, wherein (N) is greater than 1;
    setting (i) equal to 1;
    positioning said input screen in an (i)th input screen orientation, wherein (i) is greater than or equal to 1 and less than or equal to (N);
    illuminating said encoded holographic data storage medium with a reference beam to generate an (i)th reconstructed data beam comprising an (i)th reconstructed orientation image;
    projecting said (i)th reconstructed data beam onto said optical detector;
    calculating the (i)th correlation factor using the (i)th reconstructed orientation image, said orientation image, and said matched filter;
    determining if (i) equals (N);
    operative if (i) does not equal (N), incrementing (i) by unity and repeating said positioning step, said illuminating step, said projecting step, said calculating step, and said determining step;
    operative if (i) equals (N), determining an optimal optical detector orientation using the (N) correlation factors.

2. The method of claim 1, wherein said supplying a holographic data storage medium encoded with said orientation image step further comprises
    storing said orientation image on an optically transparent, read-only data storage medium; and
    physically implanting said optically transparent, read-only data storage medium in said holographic data storage medium.

3. The method of claim 1, wherein (N) is 3.

4. The method of claim 3, wherein said setting (N) input screen orientations step further comprises:
    selecting an initial rotation orientation R and an incremental rotation r;
    setting a second orientation equal to R;
    setting a first orientation equal to (R−r);
    setting a third orientation equal to (R+r).

5. The method of claim 4, wherein said optical detector comprises a plurality of detector elements, wherein said calculating the (i)th correlation factor step further comprises the steps of:

calculating a value V(i)(x,y) for each of said plurality of detector elements receiving a portion of the (i)th reconstructed data beam, wherein V(x,y) comprises a surface varying along the X axis and the Y axis, ξ is an integration variable along the X axis, η is an integration variable along the Y axis, * denotes a complex conjugate, and $$V(i)(x,y)=\iint g(\xi,\eta)s^*(\xi-x,\eta-y)d\xi d\eta;$$

setting said (i)th correlation factor equal to $V(i)_{AVG}$.

6. The method of claim 5, further comprising the steps of:
determining if an optimal optical detector orientation has been found;
operative if an optimal optical detector orientation has been found, using said optimal optical detector orientation to decode information encoded in said holographic data storage medium.

7. The method of claim 6, further comprising the steps of:
operative if an optimal optical detector orientation has not been found, adjusting said (N) input screen orientations.

8. An article of manufacture, in communication with an optical detector comprising a rotatable input screen, said article of manufacture comprising a processor, an orientation image, a matched filter, and a computer readable medium having computer readable program code disposed therein to determine an optimal optical detector orientation to decode holographically encoded information, the computer readable program code comprising a series of computer readable program steps to effect:

retrieving (N) pre-determined input screen orientations, wherein (N) is greater than 1;
setting (i) equal to 1;
positioning said input screen in an (i)th input screen orientation, wherein (i) is greater than or equal to 1 and less than or equal to (N);
illuminating said encoded holographic data storage medium with a reference beam to generate an (i)th reconstructed data beam comprising an (i)th reconstructed orientation image;
projecting said (i)th reconstructed data beam onto said optical detector;
calculating the (i)th correlation factor using the (i)th reconstructed orientation image, said orientation image, and said matched filter;
determining if (i) equals (N);
operative if (i) does not equal (N), incrementing (i) by unity and repeating said positioning step, said illuminating step, said projecting step, said calculating step, and said determining step;
operative if (i) equals (N), determining an optimal optical detector orientation using the (N) correlation factors.

9. The article of manufacture of claim 8, wherein said holographic data storage medium comprises an implanted, optically transparent, read-only data storage medium, wherein said orientation image is encoded in said optically transparent, read-only data storage medium.

10. The article of manufacture of claim 8, wherein (N) is 3.

11. The article of manufacture of claim 10, wherein said computer readable program code to set (N) input screen orientations step further comprises computer readable program code comprising a series of computer readable program steps to effect:

selecting an initial rotation orientation R and an incremental rotation r;
setting a second orientation equal to R;
setting a first orientation equal to (R−r);
setting a third orientation equal to (R+r).

12. The article of manufacture of claim 8, wherein said optical detector comprises a plurality of detector elements, wherein said computer readable program code to calculate the (i)th correlation factor step further comprises computer readable program code comprising a series of computer readable program steps to effect:

calculating a value V(i)(x,y) value for each of said plurality of detector elements receiving a portion of the (i)th reconstructed beam, wherein V(x,y) comprises a surface varying along the X axis and the Y axis, ξ is an integration variable along the X axis, η is an integration variable along the Y axis, * denotes a complex conjugate, and $$V(i)(x,y)=\iint g(\xi,\eta)s^*(\xi-x,\eta-y)d\xi d\eta;$$

setting said (i)th correlation factor equal to $V(i)_{AVG}$.

13. The article of manufacture of claim 12, said computer readable program code further comprising a series of computer readable program steps to effect:

determining if an optimal optical detector orientation has been found;
operative if an optimal optical detector orientation has been found, using said optimal optical detector orientation to decode information encoded in said holographic data storage medium.

14. The article of manufacture of claim 13, said computer readable program code further comprising a series of computer readable program step to effect adjusting said (N) input screen orientations if an optimal optical detector orientation has not been found.

15. A computer program product encoded in an non-transitory information storage medium, said computer program product being useable with a processor in communication with an optical detector comprising a rotatable input screen to determine an optimal input screen orientation, comprising:

computer readable program code which causes said programmable computer processor to retrieve (N) pre-determined input screen orientations, wherein (N) is greater than 1;
computer readable program code which, for each value of (i), causes said programmable computer processor to position said input screen in the (i)th input screen orientation, wherein (i) is greater than or equal to 1 and less than or equal to (N);
computer readable program code which, for each value of (i), causes said programmable computer processor to illuminate with a reference beam a holographic data storage medium encoded with an orientation image to generate and project onto said optical detector an (i)th reconstructed data beam comprising an (i)th reconstructed orientation image;
computer readable program code which, for each value of (i) causes said programmable computer processor to calculate an (i)th correlation factor using the (i)th reconstructed orientation image, said orientation image, and a matched filter;
computer readable program code which causes said programmable computer processor to determine an optimal optical detector orientation using the (N) correlation factors.

16. The computer program product of claim 15, wherein (N) is 3.

17. The computer program product of claim 16, wherein said computer readable program code to set (N) input screen orientations step further comprises:

computer readable program code which causes said programmable computer processor to select an initial rotation orientation R and an incremental rotation r;

computer readable program code which causes said programmable computer processor to set a second orientation equal to R;

computer readable program code which causes said programmable computer processor to set a first orientation equal to (R−r);

computer readable program code which causes said programmable computer processor to set a third orientation equal to (R+r).

18. The computer program product of claim 17, wherein said optical detector comprises a plurality of detector elements, wherein said computer readable program code to calculate an (i)th correlation factor step further comprises:

computer readable program code which causes said programmable computer processor to calculate, for each value of (i), a V(i)(x,y) value for each of said plurality of detector elements receiving a portion of the (i)th reconstructed data beam, wherein V(x,y) comprises a surface varying along the X axis and the Y axis, ξ is an integration variable along the X axis, η is an integration variable along the Y axis, * denotes a complex conjugate, and $$V(i)(x,y)=\iint g(\xi,\eta)s^*(\xi-x,\eta-y)d\xi d\eta;$$

computer readable program code which causes said programmable computer processor to calculate, for each value of (i), $V(i)_{AVG}$.

19. The computer program product of claim 18, further comprising:

computer readable program code which causes said programmable computer processor to determine if an optimal optical detector orientation has been found;

computer readable program code which, if an optimal optical detector orientation has been found, causes said programmable computer processor to use said optimal optical detector orientation to decode information encoded in said holographic data storage medium.

20. The computer program product of claim 19, further comprising computer readable program code which, if an optimal optical detector orientation has not been found, causes said programmable computer processor to use said optimal optical detector orientation adjusting said (N) input screen orientations.

* * * * *